United States Patent [19]

Rand

[11] Patent Number: 4,498,231

[45] Date of Patent: Feb. 12, 1985

[54] THIN FILM STRAIN TRANSDUCER

[75] Inventor: James L. Rand, San Antonio, Tex.

[73] Assignee: The United States of America as represented by the Administrator of the National Aeronautics and Space Administration, Washington, D.C.

[21] Appl. No.: 526,770

[22] Filed: Aug. 26, 1983

Related U.S. Application Data

[62] Division of Ser. No. 352,827, Feb. 26, 1982, Pat. No. 4,425,808.

[51] Int. Cl.³ .............................................. H01C 17/00
[52] U.S. Cl. ................................................... 29/610 SG
[58] Field of Search ................... 29/610 SG; 338/2–6; 73/862.65, 862.66, 862.67, 862.39, 838

[56] References Cited

U.S. PATENT DOCUMENTS

| | | | |
|---|---|---|---|
| 2,600,701 | 6/1952 | Statham et al. | 73/862.65 |
| 3,022,570 | 2/1962 | Taylor | 338/2 |
| 3,049,685 | 8/1962 | Wright, Jr. | 338/2 |
| 4,048,850 | 9/1977 | Ramberg et al. | 73/862.39 |
| 4,166,384 | 9/1979 | Matsuda et al. | 73/862.65 |
| 4,175,428 | 11/1979 | Eilersen | 73/862.64 |
| 4,282,762 | 8/1981 | Zenker | 73/862.65 |

Primary Examiner—Howard N. Goldberg
Assistant Examiner—P. W. Echols
Attorney, Agent, or Firm—Howard J. Osborn; John R. Manning; Wallace J. Nelson

[57] ABSTRACT

A strain transducer system 10 and process for making same is disclosed wherein a beryllium-copper ring 13 having four strain gages 12, 14, 26 and 28 disposed thereon and electrically connected in Wheatstone bridge fashion to output instrumentation 25. Tabs 16 and 20 are bonded to a balloon or like surface 11 with strain on the surface 11 causing bending of ring 13 and providing an electrical signal through gages 12, 14, 26 and 28 proportional to the surface strain. FIG. 2 illustrates a pattern of a one-half ring segment as placed on a sheet of beryllium-copper for chem-mill etch formation, prior to bending and welding of a pair of the segments to form a ring structure 13.

2 Claims, 2 Drawing Figures

THIN FILM STRAIN TRANSDUCER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

This is a division of application Ser. No. 352,827 filed Feb. 26, 1982, now U.S. Pat. No. 4,425,808.

BACKGROUND OF THE INVENTION

Scientific balloon platforms have been developed to carry payloads to the upper limits of the atmosphere to observe and record a variety of phenomena. Design, analysis techniques, and film quality have steadily improved such that balloon flights are now performed on a relatively routine basis. Scientists, however, need systems that can carry heavier payloads to higher altitudes for longer durations. This requires balloons which test state-of-the-art film design and production. The degraded reliability of heavy lift systems is well known and emphasizes the need for a more precise approach to balloon design and manufacturing.

The most widely used scientific balloon system is the natural shaped balloon made of thin, balanced, polyethylene film. Unfortunately, balloon strain cannot be predicted accurately by closed form analytical methods. Although balloon stresses are not usually of sufficient magnitude to cause failure of the balloon film, they do cause cracks to propagate and provide a state conducive to amplification of any flaws or manufacturing defects.

Flight testing of balloons has been used successfully to obtain data on atmospheric properties, gas and skin temperatures, radiant flux, and pressure measurements. Attempts to measure film or tape stress and strain, however, have not been completely successful. The hostile environment of flight is dynamic and includes a variety of heat transfer mechanisms which alter the balloon and sensor temperatures. The films are so thin that the presence of a sensor usually results in a localized stiffening of the film which alters the measurement. As a result, even large gage lengths of very stiff materials such as polyester films are used with only limited success. There is need for a strain gage suitable for flight which can verify or negate the assumptions contained in thin film balloon stress prediction analyses. In addition, need has been established for an analytic model of the thin polyethylene film used in fabrication of scientific balloon platforms. A description of the mechanical response of balloon materials is necessary if stresses are to be deduced from in-flight strain measurements. This invention relates to a unique sensor capable of monitoring the strain in the wall of a typical balloon when exposed to the hostile environment of ascent and float. Its use will facilitate prediction of balloon stresses for particular flights, and design and testing of balloon materials in general.

It is therefore an object of the present invention to provide a strain transducer system which is suitable for in-flight measurement of balloon film strain because of its lightweight, linear response to strain, and mechanical and electrical compatibility with existing balloon systems.

A further object of this invention is to provide a strain transducer with an annular configuration that is insensitive to the transverse forces and thermal distortions experienced by balloons during flight.

Another object of this invention is to provide a strain transducer with a low effective modulus of elasticity that is particularly sensitive to the relatively small longitudinal forces and large deformations suffered by balloons in flight.

A still further object of this invention is to provide a device that can function in ranges from relatively warm temperatures ($+25°$ C.) of an afternoon launch to the lowest temperatures ($-80°$ C.) found during ascent through the tropopause.

An additional object of the present invention is to provide a strain transducer system with attachment tabs that minimize the local discontinuities in film stress caused by stiffness at the points where the transducer is fitted to the thin film balloon surface.

SUMMARY OF THE INVENTION

The foregoing and other objects of the invention are achieved by providing a transducer comprised of a thin, lightweight, ring shaped metal strip. This transducer device is attached to a thin walled polyethylene scientific balloon via tabs specifically designed to minimize stiffness at the attach points. The transducer has a low effective modulus so as not to interfere with the strain that naturally occurs in balloon walls. Therefore, bending rigidity of the metal strip is such that the force required to deform the sensor is small relative to forces required to displace the film.

Strain gages are attached to the annular metal strip to form a Wheatstone bridge circuit. The output from the balanced bridge is taken proportional to the bending strain in the metal strip between the attachment tabs. By suitable choice of strain gages, the transducer can have a standard 350 ohm impedance which is compatible with bridge balance, amplification, and telemetry instrumentation available for balloon flight.

Prior art strain transducers normally measure small deformations caused by relatively large forces. The transducer of the present invention has a high sensitivity to longitudinal strain. This sensitivity is constant over the range of temperatures and strains normally experienced during balloon flight. In addition, the invention is not appreciably affected by thermal distortions. These characteristics make this transducer system particularly attractive for functioning under the small forces and large elongations characteristic of balloons in flight.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein.

DETAILED DESCRIPTION OF THE INVENTION

The invention relates to a strain transducer system useful for measuring strain on an expandable material and particularly suitable for in-flight measurements of balloon film strain. The transducer is comprised of a ring shaped beryllium-copper strip with two tabs that can attach to the thin film of balloon surfaces. Four strain gages and associated wiring are affixed to the ring to form a Wheatstone bridge circuit. The invention is lightweight and thermally passive. It responds linearly to strain, has a low modulus of elasticity, and is mechanically and electrically compatible with existing balloon systems. Though the preferred embodiment describes a strain gage used to measure the strain suffered by thin film polyethylene balloons, other applications for this invention will become apparent to those skilled in the art.

Figure 1:
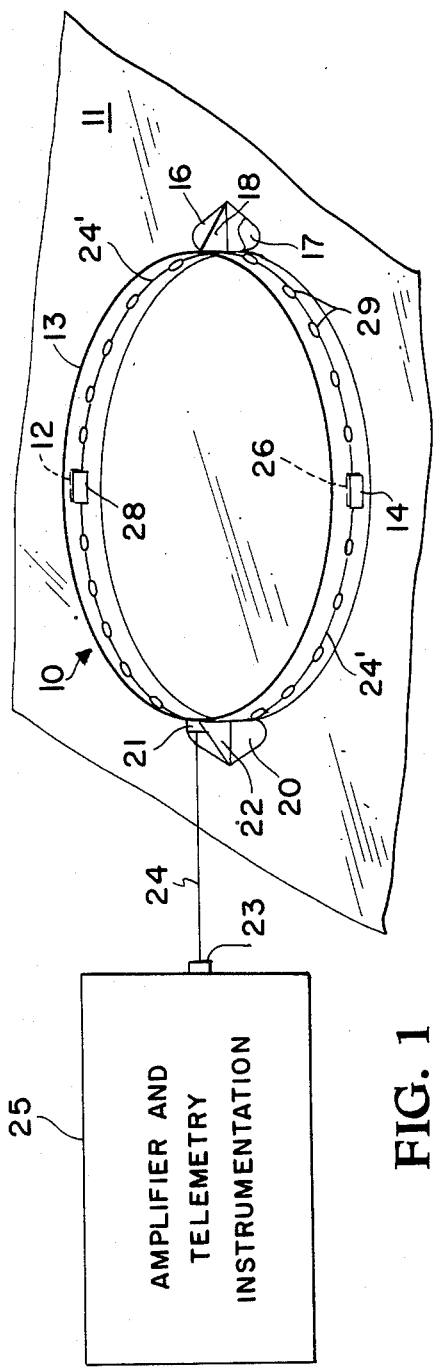
FIG. 1 is a part schematic view of the thin film strain transducer of the present invention showing the strain gages, attachment tabs (with part of one broken away to illustrate the buffer pads), and associated wiring on a balloon surface segment.

Referring now more particularly to FIG. 1, the strain transducer system of the present invention is shown and generally designated by reference numeral 10. An important design feature of the invention is minimization of the induced stiffness at the attachment points where the gage ring 13 is fitted to balloon surface 11. Tabs 16 and 20 were designed to satisfy this requirement.

Analysis of several triangular tab configurations indicated a relatively large stress concentration in the balloon film at the vertex of the tab. A 70% percent increase in the applied stress was computed. Such stress is sufficient to cause gross film deformation and possible failure of the film at low temperatures. Therefore, a tab configuration was designed with a 2:1 elliptic geometry as shown by tab 16 in FIG. 1. As a result, the maximum film stress concentration was reduced to less than 24%; however, the apparent strain was increased by 17%. To minimize the tab influence on apparent strain, the straight edges shown on tab 16 were used to bound the gage length. In addition, the gage length was increased to further reduce apparent strain. The distance between tabs 16 and 20 was set at 76 millimeters so that the apparent strain remained within 3% of the film strain in the absence of the gage. To further minimize stress concentrations, the outer edge of tabs 16 and 20 were provided with curvature. A semicircular shape with rounded corners was selected for this boundary as depicted by tab 16 in FIG. 1. In addition, the tabs were fitted with polyethylene buffer pads (one of which is designated by reference numeral 17) to minimize the disturbance to the stress field between the tabs.

The thickness of the metal strip forming transducer ring 13 was another critical design parameter. Optimal thickness is dependent on the choice of material. Recognizing the need for a material with low hysteresis and a high proportional limit, a copper alloy was selected for its remarkably linear behavior, high endurance and strength limits, thermal compatibility with precision strain gages, availability in small thicknesses and ease of formability. The alloy selected contains 1.80-2.00 percent beryllium and is described by a variety of specifications (ASTM B-194-72, QQ-C-533, AMS 4503B, and ASM 4532A). The particular material employed in the specific embodiment described herein was obtained from Brush Wellman, Inc., 17876 St. Clair Avenue, Cleveland, Ohio, 44110, and is identified by Brush wellman as Alloy 25. In order to have a gage length of 76 millimeters, the ring 13 radius was set at 38 millimeters. The thinnest material available created unacceptably high stresses in the transducer, and the thickest material considered caused an unacceptably high ratio of transducer to film force. A strip thickness of 0.0889 mm was finally selected as a compromise.

Figure 2:
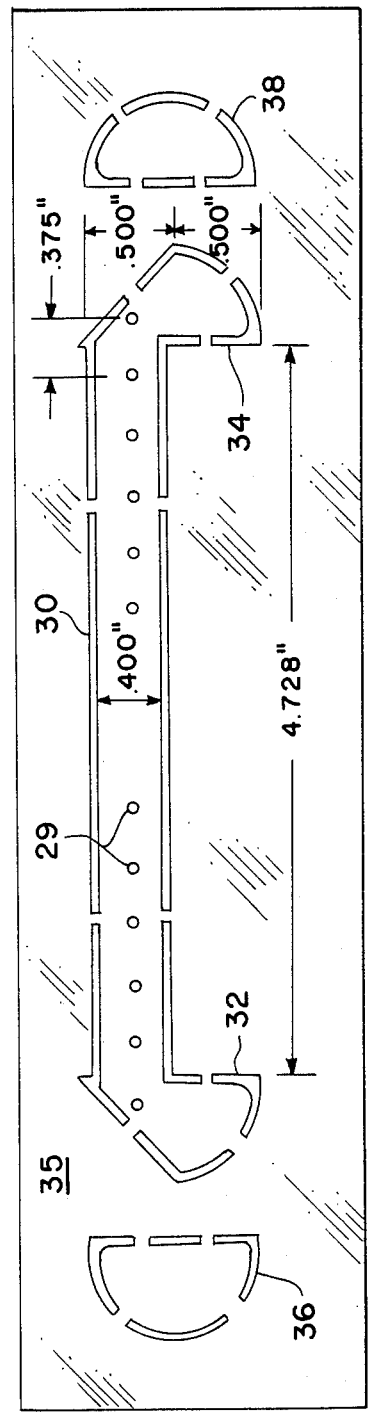
FIG. 2 shows the chemical milling pattern used to fabricate the thin film transducer of the present invention.

The thin film strain transducer is fabricated in four pieces from beryllium-copper coil stock. Due to the thickness of the strip material, chemical milling of the sheet proves to be the most economical and accurate method of forming the transducer components. A pattern 30 is first drawn on a scale four times that described and then reduced photographically to produce a negative of the appropriate dimensions. The resulting negative, FIG. 2, is then transferred to the beryllium-copper sheet 35 and the boundaries of the pattern etched away by a conventional chem-mill process. In this process, the thin plate is cleaned and coated with "photo polymer resist;" exposed to ultraviolet light to produce a high contrast image; developed in commercial "photo polymer" developer; etched in Ferric Chloride42 degree Be at 125° F. The "photo resist" is then removed with a commercial MEK based stripper. "Photo polymer resist", "photo polymer" developer and the methylethylketone (MEK) stripper are standard commercial items and are readily obtainable from Kodak and other commercial sources. The pattern 30 is sized to preserve the basic design geometry and provide sufficient material to accommodate a bend radius of five times the sheet thickness to form the tab.

The two bends 32 and 34 in FIG. 2 form half of gussets 18 and 22 and tabs 16 and 20 in FIG. 1. The selected material is in the half-hard condition so that bending is accomplished without damage. Two strips are spot welded together. Semicircular tabs 36 and 38 in FIG. 2 are then welded to the tabs on the strips to form a double layer tab. The welded ring is then placed on a brass mandrel having the same thermal characteristics as the beryllium-copper alloy, and heat treated for two hours at 315° C. This heating brings the material to full strength. The transducer is electrochemically treated to remove the oxide coating that forms during the heat treating process. In the specific embodiment described herein oxide was removed by means of an alkaline deoxidizing tradename compound known as Endox® 214 and manufactured by Ethone, Inc., West Haven, Conn. The process involved immersion of the strip into a solution of one ounce Endox to one pint of water. A potential of eight volts was then applied for one minute per ring. The Endox employed herein was supplied by Delgman Supply Company, Inc., 113 South Magnolia, P.O. Box 579, North Little Rock, Ark., 72115.

Four precision strain gages 12, 14, 26 and 28 are bonded to the inner and outer surfaces at the center ring 13. Gages 12 and 14 are diametrically opposed and located on the exterior surface of transducer ring surface while gages 26 and 28 are positioned on the inner surface of the ring as shown in FIG. 1. The gages are standard 350 ohm general purpose gages having a constant grid completely encapsulated in olyimide with large, integral, copper-coated terminals. The gages employed in the specific example described herein were obtained from Micromeasurements, Inc., P.O. Box 27777, Raleigh, N.C., 27611, under their type designation CEA-09-125UW-350. The gage resistance was selected due to its enhanced current carrying ability and compatibility with other low impedance devices currently used on scientific balloons. The gages are thermally compensated for beryllium-copper and calibrated for use in the temperature range from −75° C. to +205° C.

The strain gages are bonded to the transducer with a suitable adhesive with M-Bond 600, a Micromeasurements Inc. product having a wide temperature range capability being employed in the described embodiment. This two component, solvent thinned epoxyphenolic adhesive is recommended for high precision transducers and has an operating temperature range from −269° C. to +260° C. The adhesive is cured for two hours at 55° C. Curing produces an oxide coating on the transducer that must be cleaned prior to applying any coatings for moisture or thermal control. This cleaning was accomplished by using MEK (methylethylkeytone) applied with a cotton swab, washing with Alconox detergent and water, rinsing under running water and dried in an oven at 110° F. for twenty minutes. In addition to the gages, a terminal board 21 (not illustrated) is bonded to tab 20 to facilitate wiring of the gages into a Wheatstone bridge circuit.

The bridge circuit is formed by connecting the two gages 12 and 14 on the outer surface of the ring into opposite areas of the circuit. The gages 26 and 28, on the inner ring surface, also form opposite circuit arms and are used to complete the four active arm bridge. In this configuration, the output of the circuit is insensitive to any axial and thermal strains common to all gages. The output from the balanced bridge is theoretically proportional to the bending strain in the beryllium-copper strip. As such, the output signal is directly proportional to the film strain between the tabs 16 and 20 of the transducer. The wiring is completed by using a white four conductor shielded cable 24 with the individual wires 24' thereof threaded through suitable holes 29 in ring 13 and leading through a terminal board 21 disposed on tab 20 to conventional bridge amplifier and telemetry instrumentation 25. Cable 24 in the specific example described was a four conductor, shielded ultraflexible cable (Bioelectric Cable No. CZ 1103-4F) supplied by Cooner Wire Company, 9186 Independence Avenue, Chatsworth, Calif., 91311. The end of cable 24 leading to amplifier and telemetry instrumentation was terminated with a four pin microminiature plug (No. DP-45-1) obtained from Microtech, Inc., 1420 Conchester Highway, Boothwyn, Pa., 19061, and designated by reference numeral 23 in FIG. 1. The final step in the fabrication process involves applying a thermal control waterproof coating to the metal strip, tabs, strain gages, and buffer pads. This coating serves to protect the strain gages and terminal connections from any moisture encountered during balloon flight as well as providing passive thermal control because of the resulting low absorptivity and high emissivity. In the specific example described herein, the white thermal control coating employed was designated as S-13G/LO and produced by IIT Research Institute, 10 West 35th Street, Chicago, Ill., 60616.

OPERATION OF THE INVENTION

The transducer is anchored to balloon film 11 so that the plane containing the circle is parallel to the film. As balloon film 11 is strained by the dynamics of flight, the transducer ring 13 is displaced. Assuming the film strain is constant between tabs 16 and 20 in FIG. 1, the tabs collect the force required to deform the ring.

A reactive force necessarily accompanies the displacement of transducer ring 13. Due to the low effective modulus of the transducer, however, this force is small relative to the force required to displace film 11 through the same strain. A load path is established from film 11, through each tab connection, partially to the ring and the balance to the film between the tabs. As mentioned, the tabs increase the apparent strain; however, the effect of the transducer stiffness on the balloon surface reduces the force film 11 is required to transfer. These two effects tend to balance each other minimizing the associated errors.

Testing has demonstrated that transducer 10 has a high sensitivity to longitudinal strain (7.216 mV/V/unit strain). The sensitivity is constant for all temperatures from +25° C. to −80° C., and all strains from five percent compression to ten percent tensile strain. The response is highly sensitive to the separation distance of the tabs, and relatively insensitive (0.27 percent) to transverse forces. Tests further show that transducer 10 responds in a constant linear fashion at all strains and temperatures of interest. In addition, the sensor ring standard 350 ohm impedance was found to be electrically compatible with bridge amplifiers and telemetry instrumentation currently used on scientific balloons.

The specifically described example transducer and the process for making same described herein are to be considered as exemplary only and are not to be deemed as exhaustive. Also, although the performance of the specific embodiment described herein is for measuring strain on atmospheric balloon structures, the invention is not so limited and, as will be apparent to those skilled in the art, the transducer gage system of the present invention would find utility in measurements of strain on any suitable material adapted to be placed under strain. Thus, there are obviously many variations and modifications of the present invention that will be readily apparent to those skilled in the art in light of the above teachings. Accordingly, the invention may be practiced other than described herein without departing from the spirit or scope of the appended claims.

What is claimed as new and desired to be secured by Letters Patent of the United States is:

1. A method of making a thin film strain transducer for use in accurately measuring strain on thin films comprising:
    (a) providing a thin sheet or beryllium-copper alloy stock in the half-hard condition;
    (b) drawing a pattern of a one-half segment four times the dimensions of the final product and consisting of an elongated strip provided with twelve equal diameter and uniformly spaced holes and a pair of tab portions;
    (c) photographically reducing this pattern to produce a negative of the actual size desired;
    (d) transferring this negative image to the beryllium-copper alloy sheet;
    (e) masking the image and immersing the sheet in a chemical solution to chem-mill the excess material away from the masked pattern to recover an elongated strip of material and a pair of semicircular tab elements;
    (f) repeating steps (b), (c), (d) and (e) to recover identical pattern portions;
    (g) bending the identical elongated strips to form a pair of semicircular segments and with bent gusset extensions on each end thereof;
    (h) spot welding the pair of semicircular strips to form a ring and spot welding a pair of the semicircular tab elements to the gussets extending from each strip to form a double layered tab;

(i) placing the assembled ring and tab structure onto a mandrel having essentially the same thermal characteristics as the beryllium-copper alloy and heat treating this assembly for approximately two hours at approximately 315° C. to change the alloy from the half-hard to full strength;

(j) electrochemically removing the oxide coating formed during the heat treating process;

(k) bonding four identical precision strain gages to the ring with a pair of the strain gages positioned each at essentially the 90° stations between the diametrically disposed tabs and one member of each pair being on the outer surface of the ring; and (l) electrically connecting each strain gage in Wheatstone bridge circuit arrangement to output instrumentation.

2. The method of claim 1 including threading electrical conducting wires through the milled holes to connect each strain gage to the output instrumentation.

* * * * *